United States Patent
Nagayama et al.

(10) Patent No.: US 11,125,970 B2
(45) Date of Patent: Sep. 21, 2021

(54) METHOD FOR LENS AUTOFOCUSING AND IMAGING DEVICE THEREOF

(71) Applicant: SZ DJI TECHNOLOGY CO., LTD., Shenzhen (CN)

(72) Inventors: Yoshinori Nagayama, Tokyo (JP); Linglong Zhu, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1 day.

(21) Appl. No.: 16/356,694

(22) Filed: Mar. 18, 2019

(65) Prior Publication Data

US 2019/0212523 A1 Jul. 11, 2019

Related U.S. Application Data

(63) Continuation of application No. PCT/JP2016/080139, filed on Oct. 11, 2016.

(51) Int. Cl.
*G02B 7/38* (2021.01)
*H04N 5/232* (2006.01)
(Continued)

(52) U.S. Cl.
CPC .............. *G02B 7/38* (2013.01); *B64C 39/02* (2013.01); *B64C 39/024* (2013.01); *B64D 47/08* (2013.01);
(Continued)

(58) Field of Classification Search
CPC ... G02B 7/38; G02B 7/28; G02B 7/36; G02B 15/143; H04N 5/2252; H04N 5/232;
(Continued)

(56) References Cited

U.S. PATENT DOCUMENTS 9,253,391 B2 * 2/2016 Kimoto .................... G02B 7/36
9,491,350 B2 * 11/2016 Terauchi .................. G02B 7/38
(Continued)

FOREIGN PATENT DOCUMENTS

JP S59112241 U 7/1984
JP 2000338387 A 12/2000
(Continued)

OTHER PUBLICATIONS

World Intellectual Property Organization (WIPO) International Search Report for PCT/JP2016/080139 dated Dec. 13, 2016 5 Pages.

*Primary Examiner* — Padma Haliyur
(74) *Attorney, Agent, or Firm* — Anova Law Group, PLLC

(57) ABSTRACT

An imaging device includes a lens and a circuit configured to control the lens to move in a first direction along an optical axis of the lens, control capture of a plurality of first images via the lens when the lens is positioned at a plurality of first positions, respectively, control the lens to move in a second direction opposite to the first direction, control capture of one or more second images via the lens when the lens is positioned at one or more second positions, respectively, and determine a focus position based on one or more of a plurality of first evaluation values calculated from the plurality of first images and one or more second evaluation values calculated from the one or more second images. Each of the plurality of first evaluation values and the one or more second evaluation values indicates a corresponding focus state.

15 Claims, 12 Drawing Sheets

(51) Int. Cl.
  *H04N 5/225* (2006.01)
  *B64D 47/08* (2006.01)
  *G03B 13/36* (2021.01)
  *B64C 39/02* (2006.01)
  *G02B 7/28* (2021.01)
  *G03B 17/56* (2021.01)
  *G02B 7/36* (2021.01)

(52) U.S. Cl.
  CPC .............. *G02B 7/28* (2013.01); *G02B 7/36* (2013.01); *G03B 13/36* (2013.01); *G03B 17/56* (2013.01); *H04N 5/2252* (2013.01); *H04N 5/2254* (2013.01); *H04N 5/232* (2013.01); *H04N 5/23212* (2013.01)

(58) Field of Classification Search
  CPC ............ H04N 5/23212; H04N 5/2254; H04N 5/232123; B64C 39/02; B64C 39/024; B64C 2201/127; G03B 17/56; G03B 13/36; G03B 15/006; G03B 3/10; B64D 47/08

See application file for complete search history.

(56) References Cited

U.S. PATENT DOCUMENTS

| | | | |
|---|---|---|---|
| 9,854,155 B1* | 12/2017 | Sikka | H04N 5/23238 |
| 2013/0258171 A1* | 10/2013 | Kikuchi | H04N 5/23212 |
| | | | 348/353 |
| 2014/0132824 A1* | 5/2014 | Omata | H04N 5/232123 |
| | | | 348/345 |
| 2018/0217358 A1* | 8/2018 | Tanaka | G02B 7/36 |

FOREIGN PATENT DOCUMENTS

| | | |
|---|---|---|
| JP | 2008165141 A | 7/2008 |
| JP | 2011085928 A | 4/2011 |

* cited by examiner

Backlash Amount Information

| Position of Focus Lens | Backlash Amount |
|---|---|
| Position 1 | Backlash Amount 1 |
| Position 2 | Backlash Amount 2 |
| ⁎<br>⁎<br>⁎ | ⁎<br>⁎<br>⁎ |

FIG. 4

| Step | Imaging and AF Evaluation Value Calculation Processing | Peak Detection Processing | Actuation of Focus Lens in First Direction | Backlash Actuation | | Actuation of Focus Lens toward Focus Position |
|---|---|---|---|---|---|---|
| | | | | | Actuation of Focus Lens in Second Direction | |
| 1 | ○ | | ○ | | | |
| 2 | ○ | ○ (Peak not detected) | ○ | | | |
| 3 | ○ | ○ (Peak not detected) | ○ | | | |
| 4 | ○ | ○ (Peak detected) | | ○ | | |
| 5 | ○ | ○ (Peak not detected) | | | ○ | |
| 6 | ○ | ○ (Peak detected) | | | | ○ |

FIG. 8

| Step | Imaging and AF Evaluation Value Calculation Processing | Peak Detection Processing | Actuation of Focus Lens in First Direction | Backlash Actuation | Actuation of Focus Lens in Second Direction | Actuation of Focus Lens toward Focus Position |
|---|---|---|---|---|---|---|
| 1 | ○ | | ○ | | | |
| 2 | ○ | ○ (Peak not detected) | ○ | | | |
| 3 | ○ | ○ (Peak not detected) | ○ | | | |
| 4 | ○ | ○ (Peak detected) | | ○ | | |
| 5 | ○ | ○ (Peak not detected) | | | ○ | |
| 6 | ○ | ○ (Peak not detected) | | | ○ | |
| 7 | ○ | ○ (Peak not detected) | | | ○ | |
| 8 | ○ | ○ (Peak detected) | | | | ○ |

FIG. 10

METHOD FOR LENS AUTOFOCUSING AND IMAGING DEVICE THEREOF

CROSS-REFERENCE TO RELATED APPLICATION

This application is a continuation of International Application No. PCT/JP2016/080139, filed on Oct. 11, 2016, the entire contents of which are incorporated herein by reference.

FIELD

The disclosed embodiments relate to methods and programs for an imaging device, imaging system, and moving object.

BACKGROUND

Technology exists that moves a focus lens via a hill-climbing autofocus operation (Patent Document 1, for example).

Patent Document 1: Japanese Patent Application Publication No. 2011-85928

SUMMARY

In a method that determines a focus position based on a plurality of images captured by moving a lens, the amount of time necessary to determine the focus position can be further decreased.

An imaging device according to one aspect of the present disclosure can include a control unit. The control unit can: cause a lens to move in a first direction along an optical axis; cause a plurality of respective first images to be captured via the lens when the lens is positioned at a plurality of respective first positions; cause the lens to move in a second direction that is opposite to the first direction; and cause one or more respective second images captured via the lens when the lens is positioned at one or more respective second positions along the optical axis to be captured. The imaging device can further include a determining unit. The determining unit can determine a focus position by using one or more first evaluation values from among a plurality of first evaluation values that indicate a focus state and were calculated from the plurality of first images, and one or more second evaluation values that indicate a focus state and were calculated from the one or more second images.

The control unit can cause the one or more second positions to differ from all of the plurality of first positions.

The control unit can cause a plurality of second images to be captured via the lens when the lens is positioned at a plurality of second positions that differ from all of the plurality of first positions. The determining unit can determine the focus position by using the plurality of first evaluation values and a plurality of second evaluation values that indicate a focus state and were calculated from the plurality of second images The imaging device can further include a storage unit that stores backlash-related information for an actuation mechanism of the lens. The control unit can cause the second positions to differ from all of the plurality of first positions by using the backlash-related information stored in the storage unit.

The control unit can, when the control unit causes the lens to move to one position from among the one or more second positions by causing the lens to move in the second direction after causing the lens to move in the first direction, cause the lens to move to the one position that differs from all of the plurality of first positions by using the backlash-related information stored in the storage unit.

The storage unit can store the backlash-related information so as to correspond to a position of the lens along the optical axis.

The control unit can, when the control unit causes the lens to move in the second direction after causing the lens to move in the first direction, cause the lens to move to the one position that differs from all of the plurality of first positions by using backlash-related information that is stored in the storage unit and that corresponds to a current position of the lens.

The imaging device can further include a storage unit that stores backlash-related information for an actuation mechanism of the lens. The determining unit can determine the focus position based on the one or more first evaluation values, one or more first positions, from among the plurality of first positions, of the lens from when images from which the one or more first evaluation values were obtained were respectively captured, the one or more second evaluation values, and the one or more second positions that are based on the backlash-related information.

A moving object according to an aspect of the present disclosure can move with the imaging device.

An imaging system according to an aspect of the present disclosure includes the imaging device. The imaging system can further include a carrier that supports the imaging device. The imaging system can further include a handle attached to the carrier.

A method according to an aspect of the present disclosure can include: causing a lens to move in a first direction along an optical axis; causing a plurality of respective first images to be captured via the lens when the lens is positioned at a plurality of respective first positions; causing the lens to move in a second direction that is opposite to the first direction; and causing one or more respective second images captured via the lens when the lens is positioned at one or more respective second positions along the optical axis to be captured. The method can further include determining a focus position by using one or more first evaluation values from among a plurality of first evaluation values and one or more second evaluation values. The one or more first evaluation values indicate a focus state and are calculated from the plurality of first images. The one or more second evaluation values indicate a focus state and are calculated from the one or more second images.

A program according to an aspect of the present disclosure causes a computer to: move a lens in a first direction along an optical axis; capture a plurality of respective first images via the lens when the lens is positioned at a plurality of respective first positions; move the lens in a second direction that is opposite to the first direction; and capture one or more respective second images via the lens to be captured when the lens is positioned at one or more respective second positions along the optical axis. The program can further cause the computer to determine a focus position by using one or more first evaluation values from among a plurality of first evaluation values and one or more second evaluation values. The one or more first evaluation values indicate a focus state and are calculated from the plurality of first images. The one or more second evaluation values that indicate a focus state and are calculated from the one or more second images.

It is possible in a method that determines a focus position based on a plurality of images captured by moving a lens to further decrease the amount of time required to determine the focus position.

The features described above can also be arranged into a variety of sub-combinations.

BRIEF DESCRIPTION OF THE DRAWINGS

FIG. 4 illustrates one example of backlash amount information for the lens 164.

FIG. 8 illustrates one example of the details of operations executed during focus control by a first control unit 142.

FIG. 10 illustrates one example of the details of operations executed during focus control in a comparison example.

DETAILED DESCRIPTION OF THE EMBODIMENTS

Figure 1:
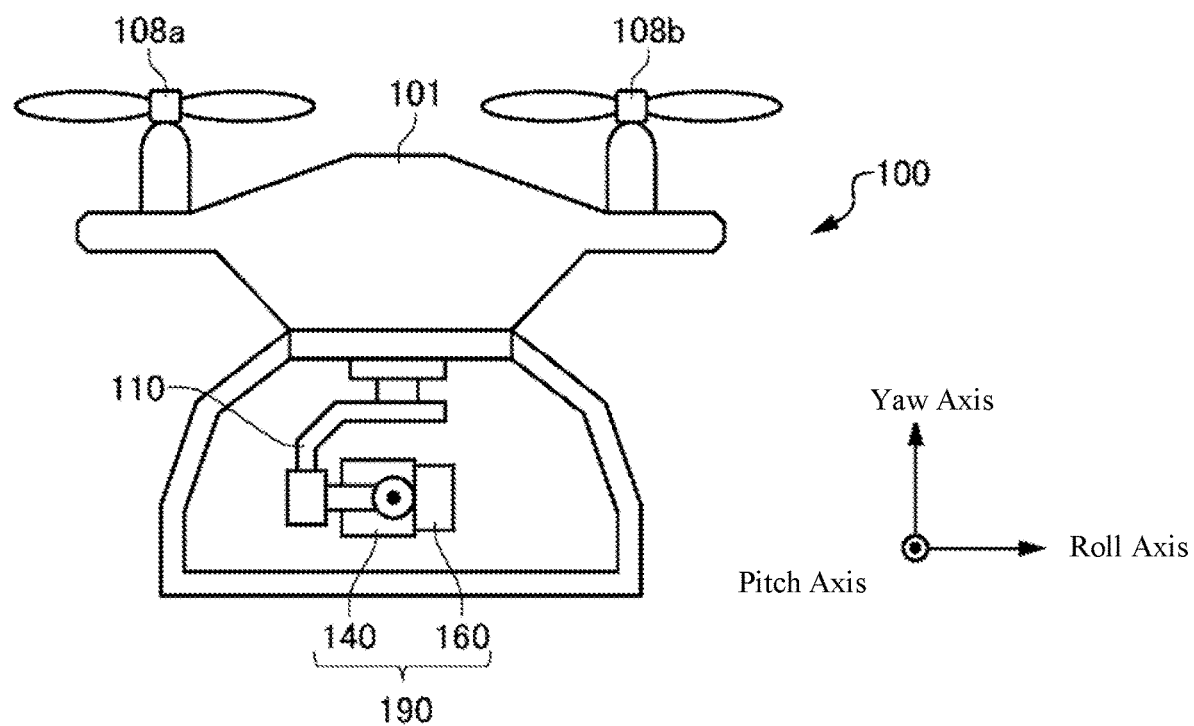
FIG. 1 illustrates one example of an exterior of an unmanned aerial vehicle (UAV) 100.

The present disclosure is described below using embodiments of the present disclosure, but the embodiments below do not limit the disclosure according to the scope of the claims. All combinations of features described in the embodiments are not necessary for the means to solve the disclosure.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

The various embodiments of the present disclosure can be described by referring to the flow charts and block diagrams. Each block can represent: 1) a process in which an operation is executed; or 2) a "unit" of a device that has a function of executing an operation. Specific steps and "units" can be implemented via a dedicated circuit, a processor, and/or a programmable circuit. A dedicated circuit can include a digital and/or analog hardware circuit. The dedicated circuit can also include an integrated circuit (IC) and/or a discrete circuit. A processor can be used in conjunction with computer readable instructions stored in a computer readable medium. A programmable circuit can be used in conjunction with computer readable instructions stored in a computer readable medium. The programmable circuit can include a reconfigurable hardware circuit. The reconfigurable hardware circuit can include: a logic AND, a logic OR, a logic XOR, a logic NAND, a logic NOR, or other type of logic operation, and a memory element such as a flip-flop, a register, a field programmable gate array (FPGA), a programmable logic array (PLA), or the like.

A computer readable medium can include any tangible device that can store instructions to be executed by an appropriate device. As a result, the computer readable medium having instructions stored therein can form at least a portion of a product that includes instructions that are executable to create means for executing the operations designated in a flow chart or block diagram. Examples of a computer readable medium can include an electronic storage medium, a magnetic storage medium, an optical storage medium, an electromagnetic storage medium, a semiconductor storage medium, and the like. More specific examples of a computer readable medium can include a Floppy® disk, a diskette, a hard disk, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), a digital versatile disc (DVD), a blue Ray® disc, a memory stick, an integrated circuit card, and the like.

Computer readable instructions can include either source code or object code written in any combination of one or more of programming languages. One or more programming languages can include a conventional procedural programming language. The one or more of programming languages can be: an object-oriented programming language such as Smalltalk, JAVA®, C++, or the like; "C" programming language; or a similar programming language. The computer readable instructions can include: assembler instructions; instruction set architecture (ISA) instructions; machine instructions; machine-dependent instructions; microcode; firmware instructions; or state setting data. The computer readable instructions can be provided to a general-use computer, a special-purpose computer, or a programmable circuit or processor in another programmable data processing device. The computer readable instructions can be provided either locally or via a local area network (LAN) or a wide area network (WAN) such as the Internet. The processor or programmable circuit can execute computer readable instructions in order to create means for executing the operations designated in a flow chart or block diagram. Examples of a processor include a computer processor, a processing unit, a microprocessor, a digital signal processor, a controller, a microcontroller, and the like.

FIG. 1 illustrates one example of an exterior of an unmanned aerial vehicle (UAV) 100. The UAV 100 can include: a UAV body 101; a gimbal 110; and an imaging device 190. The imaging device 190 includes an imaging unit 140 and a lens device 160. The UAV 100 is one example of a moving object that includes an imaging device. A moving object is a concept that, other than UAVs, includes other aerial vehicles moving in the air, a vehicle moving on the ground, a ship moving in the water, and the like.

The UAV body 101 can be provided with a plurality of rotary wings that include a rotary wing 108a and a rotary wing 108b. There are instances in which the plurality of rotary wings included in the UAV body 101 are referred to as the rotary wings 108. The rotary wings 108 are one example of a propulsion unit. The UAV body 101 can cause the UAV 100 to fly using the rotary wings 108. The UAV body 101 can cause the UAV 100 to fly by controlling the rotation of the rotary wings 108. The number of rotary wings 108 can be four. The number of rotary wings 108 is not limited to four. The UAV 100 can be a fixed-wing aircraft that does not have rotary wings.

The gimbal 110 movably can support the imaging device 190. The gimbal 110 is an example of a carrier. The gimbal 110 can rotatably support the imaging device 190 about a pitch axis, for example. The gimbal 110 can rotatably support the imaging device 190 about a roll axis. The gimbal 110 can rotatably support the imaging device 190 about a yaw axis. The gimbal 110 can rotatably support the imaging device 190 about at least one axis from among the pitch axis, roll axis, and yaw axis. The gimbal 110 can rotatably support the imaging device 190 about the pitch axis, roll axis, and yaw axis, respectively. The gimbal 110 can hold the imaging unit 140 and can hold the lens device 160. The gimbal 110 can modify the imaging direction of the imaging device 190 by causing the imaging unit 140 and the lens device 160 to rotate about at least one of the yaw axis, the pitch axis, and the roll axis.

The imaging unit 140 can generate and record image data of optical images formed via the lens device 160. The lens device 160 can be integrally provided with the imaging unit 140. The lens device 160 can be a so-called "interchangeable lens." The lens device 160 can be removably provided on the imaging unit 140.

Figure 2:
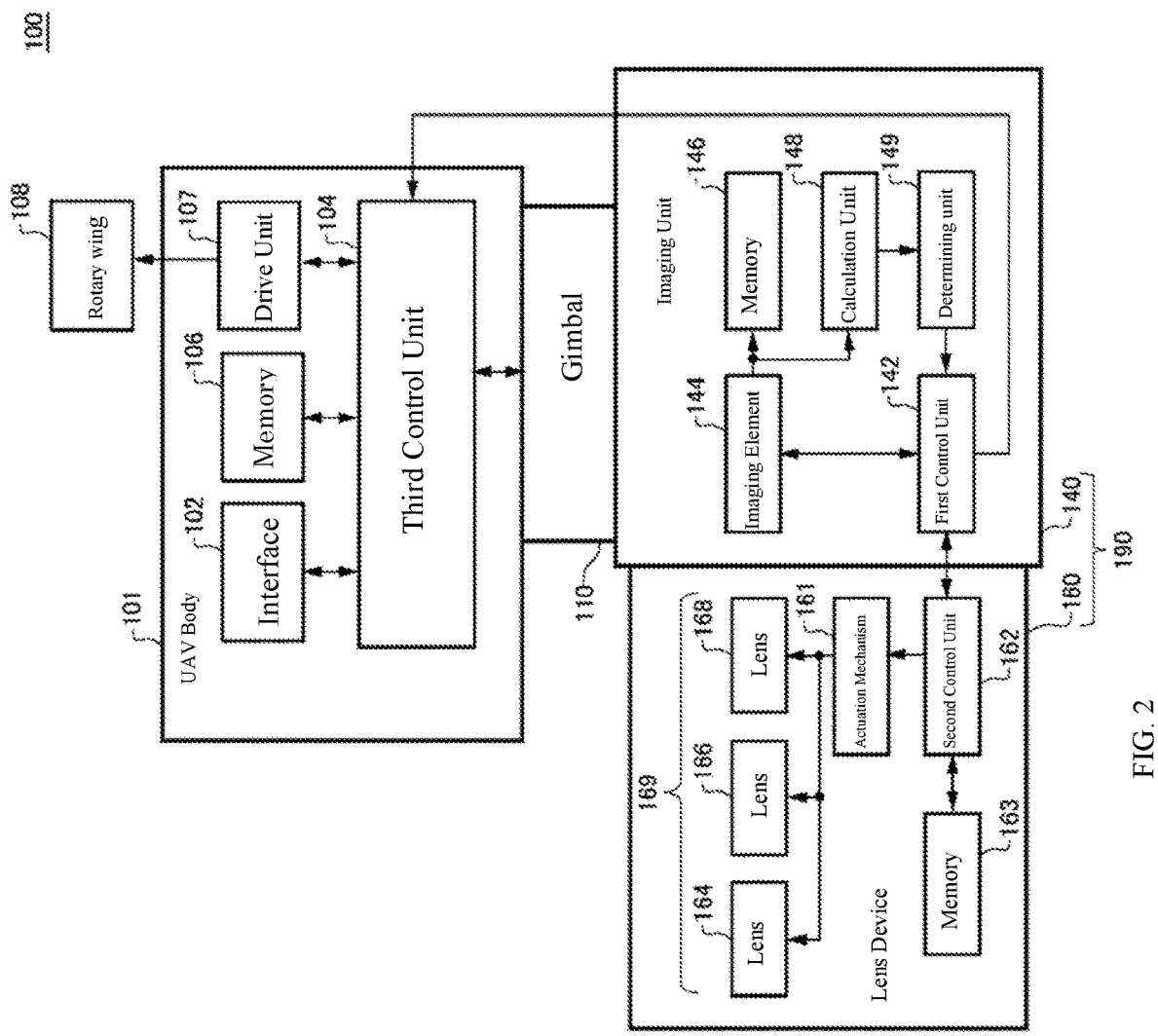
FIG. 2 illustrates one example of a functional block of the UAV 100.

FIG. 2 illustrates one example of a functional block of the UAV 100. The UAV body 101 can include: an interface 102; a third control unit 104; memory 106; a drive unit 107; and the rotary wings 108.

The drive unit 107 can function as a drive unit for causing the UAV 100 to move. The drive unit 107 can include motors for driving the rotary wings 108. For the motors included in the drive unit 107, one motor can be provided for each of the plurality of rotary wings 108. The drive unit 107 can include drivers for controlling the rotational speed of the drive shaft of the respective motors. The respective rotary wings 108 can rotate via the rotation of the drive shaft of the correspondingly provided motors. The UAV 100 can fly via the lift achieved by the rotation of the rotary wings 108.

The interface 102 can communication with an external transmitter. The interface 102 can receive various types of instructions from a remote transmitter. The third control unit 104 can control the flight of the UAV 100 based on instructions received from the transmitter. The third control unit 104 can control the gimbal 110, the imaging unit 140, and the lens device 160. The third control unit 104 can directly or indirectly control the gimbal 110, the imaging unit 140, and the lens device 160.

The third control unit 104 can be configured by a microprocessor such as a CPU or MPU, a microcontroller such as an MCU, or the like. The memory 106 can store programs and the like necessary for the third control unit 104 to control the gimbal 110, the imaging unit 140, and the lens device 160. The memory 106 can be a computer readable recording medium. The memory 106 can include at least one of: SRAM; DRAM; EPROM; EEPROM; and flash memory such as USB memory. The memory 106 can be provided on the housing of the UAV 100. The memory 106 can be removably provided with the housing of the UAV 100.

The third control unit 104 can output control instructions for the gimbal 110. The gimbal 110 can cause the imaging device 190 to rotate about at least one of the yaw axis, the pitch axis, and the roll axis based on control instructions acquired from the third control unit 104. The third control unit 104 can output to the imaging device 190 control instructions related to zoom values and aperture values for the lens device 160, and imaging instructions and the like for the imaging unit 140.

The imaging unit 140 can have: a first control unit 142; an imaging element 144; and memory 146. The first control unit 142 can be formed of a microprocessor such as a CPU or MPU, a microcontroller such as an MCU, or the like. The first control unit 142 controls the lens device 160 and the various units of the imaging unit 140 in accordance with control instructions from the third control unit 104. The memory 146 can be a computer readable recording medium and can include at least one of: SRAM; DRAM; EPROM; EEPROM; and flash memory such as USB memory. The memory 146 can be provided inside the housing of the imaging unit 140. The memory 146 can be provided so as to be removable from the housing of the imaging unit 140.

The first control unit 142 can output control instructions for the zoom value, the aperture value, and the like to the lens device 160 in accordance with the control instructions from the third control unit 104. The imaging element 144 can be held in the housing of the imaging unit 140. The imaging element 144 can generate image data of optical images formed via the lens device 160 and can output this data to the memory 146. The memory 146 can store the image data generated by the imaging element 144. The first control unit 142 can transfer image data to the memory 106 via the third control unit 104 and then can store the image data in the memory 106.

The imaging device 190 can have an autofocus (AF) function. The imaging device 190 can have a contrast-detection autofocus function. A calculation unit 148 can generate an evaluation value that represents a focus state of the lens device 160 based on the image data generated by the imaging element 144, for example. A determining unit 149 can determine a focus position in the lens device 160 in accordance with the evaluation value calculated by the calculation unit 148. The first control unit 142 can output a control instruction for focusing the lens device 160 on a subject to the lens device 160 in accordance with the focus position determined by the determining unit 149. As a result, the first control unit 142 can control the lens device 160 such that the evaluation value obtained from the image data increases.

The lens device 160 can include: a second control unit 162; memory 163; an actuation mechanism 161; a lens 164; a lens 166; and a lens 168. The lens 164, the lens 166, and the lens 168 can form a lens system. The lens system can form at least a portion of an optical system 169 used for imaging. At least one of the lens 164, the lens 166, and the lens 168 can be a lens group that includes a plurality of lenses. At least one of the lens 164, the lens 166, and the lens 168 can be a single lens. The lens 164, the lens 166, and the lens 168 can be disposed inside a lens barrel of the lens device 160. At least a portion or all of the lens 164, the lens 166, and the lens 168 can be displaceably held along the optical axis.

The second control unit 162 can cause at least one of the lens 164, the lens 166, and the lens 168 to move along the optical axis in accordance with control instructions from the first control unit 142. The second control unit 162 can cause mainly the lens 166 and the lens 168 to move along the optical axis during zoom control, for example. The second control unit 162 can cause the lens 164 to move along the optical axis during focus control. In the present embodiment, the lens 164 can be a focus lens that has a focusing function in the imaging device 190. Images formed via the optical system 169 in the lens device 160 are imaged via the imaging unit 140.

The actuation mechanism 161 can actuate the lens 164, the lens 166, and the lens 168. The actuation mechanism 161 can include an actuator, for example. An actuation pulse can be provided to the actuator from the second control unit 162. The actuator can displace by an actuation amount that is in accordance with the provided pulse. The actuation mechanism 161 can include a holding member that is a mechanical element that holds the lens 164, the lens 166, and the lens 168, respectively. The holding member can be a lens-holding frame, for example. The holding member can engage an actuation member that is a mechanical element that transmits the actuation power of the actuator. The actuation member can be a lead screw, for example. There is a gap where the holding member and the actuation member engage. Therefore, backlash will occur where the holding member for the lens 164 and the actuation member for the lens 164 engage. The actuation mechanism 161 is one example of an actuation mechanism for the lens 164.

An example is described in which the UAV 100 includes the first control unit 142, the second control unit 162, and the third control unit 104. However, processing executed by two or three of the first control unit 142, the second control unit 162, and the third control unit 104 can be executed by one of the control units. Processing executed by the first control unit 142, the second control unit 162, and the third control unit 104 can be executed by one control unit.

In the imaging unit 140, the first control unit 142 can cause the lens 164 to move along the optical axis in a first direction. A plurality of respective first images can be captured via the lens 164 when the lens 164 is positioned in a plurality of respective first positions. The first control unit 142 can calculate a plurality of first evaluation values that indicate focus states based on the plurality of first images. The first control unit 142 can calculate the plurality of first evaluation values in the calculation unit 148. The evaluation values can be image contrast values, for example.

The first control unit 142 can cause the lens 164 to move in a second direction opposite to the first direction. One or more respective second images can be captured via the lens 164 when the lens 164 is positioned in one or more respective second positions in the optical axis direction. The first control unit 142 can calculate one or more second evaluation values that indicate focus states based on the one or more second images. The first control unit 142 can calculate the one or more second evaluation values in the calculation unit 148.

The determining unit 149 can determine a focus position by using one or more first evaluation values and one or more second evaluation values. The one or more first evaluation values can indicate focus states and were calculated from the plurality of first images. The one or more second evaluation values can indicate focus states and were calculated from the one or more second images. The determining unit 149 can determine the focus position using three or more evaluation values that include the one or more first evaluation values and the one or more second evaluation values. The determining unit 149 can determine the focus position using a plurality of first evaluation values and one or more second evaluation values. The determining unit 149 can determine the focus position using a plurality of first evaluation values and a plurality of second evaluation values. The first control unit 142, the calculation unit 148, and the determining unit 149 can function as a focus detection device in the imaging device 190.

The first control unit 142 can cause the one or more second positions to differ from each of the plurality of first positions. The first control unit 142, when the lens 164 is positioned in a plurality of second positions that differ from each of the plurality of first positions, can cause a plurality of second images to be captured via the lens 164. The determining unit 149 can determine the focus position using a plurality of first evaluation values and a plurality of second evaluation values that indicate a focus state and were calculated from the plurality of second images.

The memory 163 can store information related to backlash in the actuation mechanism 161. The first control unit 142 can cause the second positions to differ from all of the plurality of first positions by using the backlash-related information stored in the memory 163. The first control unit 142 can acquire the backlash-related information stored in the memory 163 via the second control unit 162, and can use this information to control the second positions.

The first control unit 142, after causing the lens 164 to move in the first direction, can cause the lens 164 to move in the second direction. When the first control unit 142 causes the lens 164 to move to one of the second positions by causing the lens 164 to move in the second direction after causing the lens 164 to move in the first direction, the first control unit 142 can cause the lens 164 to move to a position different from all of the plurality of first positions by using the backlash-related information stored in the memory 163.

The memory 163 can store backlash-related information that corresponds to the position of the lens 164 along the optical axis. When the first control unit 142 causes the lens 164 to move in the second direction after causing the lens 164 to move in the first direction, the first control unit 142 can cause the lens 164 to move to a position different from all of the plurality of first positions by using the backlash-related information stored in the memory 163 that corresponds to the current position of the lens 164.

The determining unit 149 can determine the focus position based on: one or more first evaluation values; one or more first positions of the lens 164 when images from which the one or more first evaluation values are calculated are respectively captured; one or more second evaluation values; and one or more second positions based on the backlash-related information. The determining unit 149 can determine the focus position based on: a plurality of first evaluation values; a plurality of first positions of the lens 164 from when images from which the one or more first evaluation values are calculated are respectively captured; one or more second evaluation values; and one or more second positions based on the backlash-related information.

Figure 3:
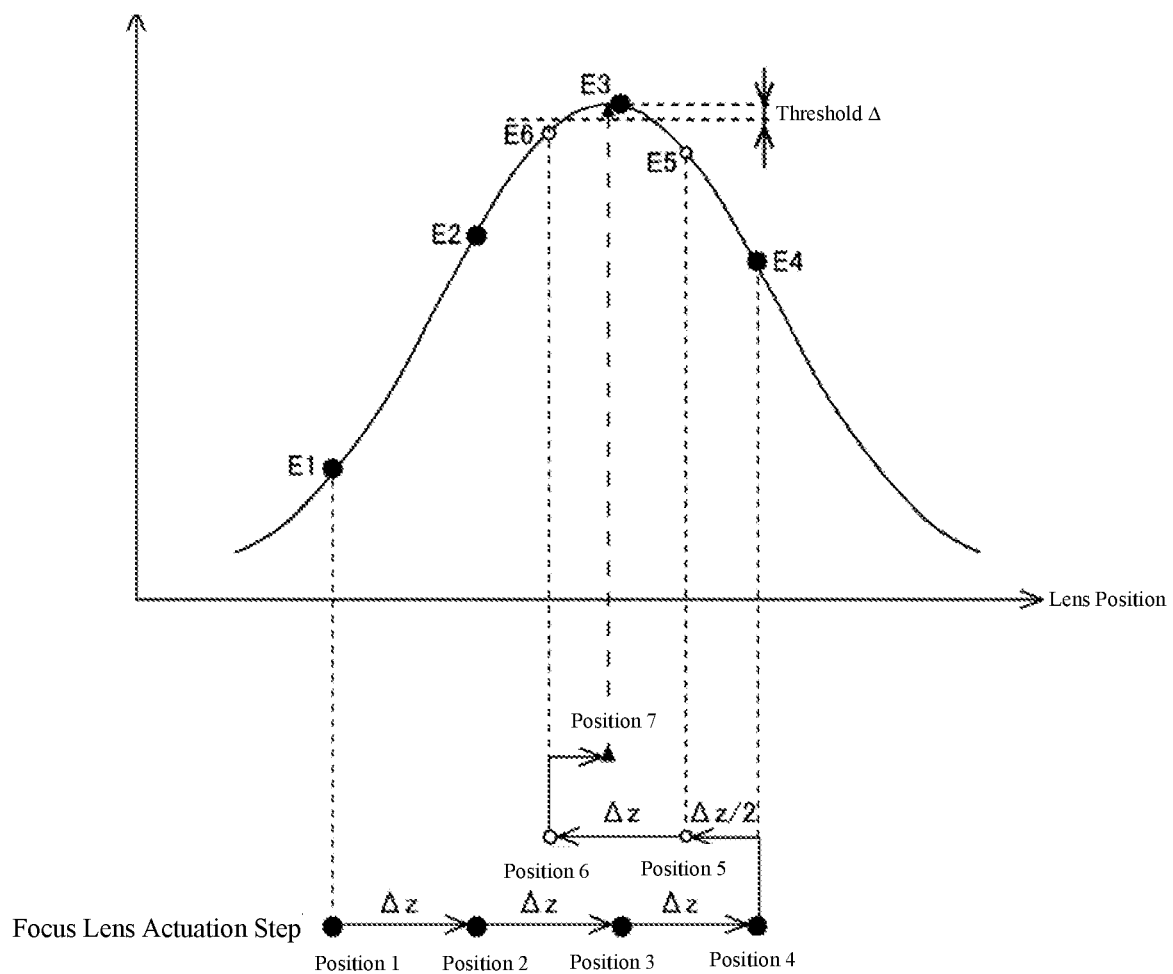
FIG. 3 illustrates a relationship between a position of a lens 164 and an evaluation value.

FIG. 3 illustrates a relationship between a position of the lens 164 and an evaluation value. The horizontal axis indicates the position of the lens 164 in the optical axis direction. The vertical axis indicates an evaluation value calculated from a captured image. The positive direction of the horizontal axis (the right direction on the paper) can correspond to the first direction. The negative direction of the horizontal axis (the left direction on the paper) can correspond to the second direction. In descriptions related to FIG. 3, the position of the lens 164 in the optical axis direction will be described using the numbers 1 to 7.

The first control unit 142 can cause the lens 164 to move via the second control unit 162 in one direction in the following order: position 1, position 2, position 3, and position 4. The first direction can be a direction in which the lens 164 passes through position 1, position 2, position 3, and position 4 in that order. The first control unit 142 can cause the imaging element 144 to perform imaging via the optical system 169 when the lens 164 is in position 1, position 2, position 3, or position 4. The first control unit 142 can cause the calculation unit 148 to calculate an evaluation value for the image captured via the optical element 144 when the lens 164 is position 1, position 2, position 3, or position 4.

The calculation unit 148 can calculate an evaluation value E1 from the image captured via the optical system 169 when the lens 164 is in position 1. Similarly, the calculation unit 148 can calculate evaluation values E2, E3, and E4 from the images captured via the optical system 169 when the lens 164 is position 2, position 3, or position 4. An evaluation value calculated from an image captured when the lens 164 is in position i will be called "Ei."

As illustrated in FIG. 3, E1<E2<E3 and E4<E3. However, E4<E3-Δ and E2<E3-Δ. In such a case, the first control unit 142 can determine upon obtaining E4 that the focus position is between position 2 and position 4. Δ is a threshold for detecting changes in the evaluation values. For example, Δ is used to determine the slope of a tangent to a curve that correlates the evaluation values with the position of the lens 164. The first control unit 142 can determine that since E3, which is larger than E2+Δ, was obtained when the lens 164 was at position 3, there is an interval where the slope of the tangent to the curve is positive between position 2 and position 3. The first control unit 142 can determine that since E4, which is smaller than E3-Δ, was obtained when the lens 164 was at position 4, there is an interval where the slope of the tangent to the curve is negative between position 3 and position 4. Thus, the first control unit 142 can determine upon obtaining E4 that there is a position where the slope of the tangent to the curve is 0 between position 2 and position 4. Since the evaluation value can be the maximum value (maximum possible value) at the position where the slope of the tangent to the curve is zero, this position can be considered to be the focus position. As a result, the first control unit 142 can determine, upon obtaining E4, that the focus position is between position 2 and position 4. In accordance with this determination, the first control unit 142 can cause the lens 164 to move in the second direction. The second direction can be a direction in which the lens 164 passes through position 4, position 5, and position 6 in that order.

The first control unit 142 can cause the imaging element 144 to perform imaging via the optical system 169 when the lens 164 is in position 5 or position 6. The first control unit 142 can cause the calculation unit 148 to calculate an evaluation value for the respective images captured via the optical element 144 when the lens 164 is in position 5 or position 6. Position 5 is a position between position 4 and position 3. Position 5 can be the midpoint between position 4 and position 3. Position 6 is a position between position 3 and position 2. Position 6 can be the midpoint between position 3 and position 2. The first control unit 142 can cause the imaging element 144 to perform imaging when the lens 164 in position 5 or position 6. The first control unit 142, when causing the lens 164 to move in the second direction, does not capture images when the lens 164 is in a position near the third position. The first control unit 142, when causing the lens 164 to move in the second direction, can set position 5 and position 6 in positions that are separated from position 3 at a distance greater than or equal to a pre-determined distance. The predetermined distance can be a distance in which substantial changes in the evaluation values can occur. For example, the pre-determined distance can be set such that changes in the evaluation values that occur when the lens 164 is caused to move by the predetermined distance exceed Δ. Separating position 5 and position 6 from position 3 by at least a pre-determined distance allows imaging to be prevented at locations where there is no substantial difference between E3 and an evaluation value.

As illustrated in FIG. 3, E5<E3-Δ and E6<E3-Δ. The first control unit 142 can determine upon obtaining E6 that the focus position is between position 6 and position 5. The first control unit 142 can determine that since E5, which is smaller than E3-Δ, was obtained when the lens 164 was at position 5, there is an interval where the slope of the tangent to the curve is negative between position 3 and position 5. The first control unit 142 can determine that since E6, which is smaller than E3-Δ, was obtained when the lens 164 was at position 6, there is an interval where the slope of the tangent to the curve is positive between position 6 and position 3. Thus, the first control unit 142 can determine upon obtaining E6 that the focus position is between position 6 and position 5. In accordance with this determination, the first control unit 142 can cause the determining unit 149 to determine the focus position. The determining unit 149 can determine a position 7, at which the evaluation value is at a maximum, using five coordinates: (position 2, E2), (position 3, E3), (position 4, E4), (position 5, E5), and (position 6, E6). The determining unit 149 can determine position 7, at which the evaluation value is at a maximum, using three coordinates: (position 3, E3), (position 5, E5), and (position 6, E6). The determining unit 149 can calculate position 7, at which the evaluation value is at a maximum, by carrying out interpolation such as Lagrange interpolation.

The first control unit 142 can cause the lens 164 to move from position 6 to position 7. The first control unit 142 automatically can carry out the operations described above. In this manner, the first control unit 142 can execute contrast-detection AF.

The first control unit 142 can cause the imaging element 144 to capture images after causing the lens 164 to move from position 6 to position 7. The image captured when the lens 164 is at position 7 can be an image used for recording. The image captured when the lens 164 is at position 7 can be recorded onto the memory 146.

As explained in relation to FIG. 3, according to the imaging device 190, not only are evaluation values obtained by causing the lens 164 to move in the second direction used to calculate the focus position, but evaluation values obtained by causing the lens 164 to move in the first direction can be also used in this calculation. Thus, compared to a case in which only evaluation values obtained by causing the lens 164 to move in the second direction are used, it is possible to decrease the number of images that need to be acquired from when the focusing operation starts until the focus position is calculated. Thus, AF speed can be increased.

FIG. 4 illustrates one example of backlash amount information for the lens 164. The backlash amount information can match up the position of the lens 164 and the backlash amount. The backlash information can be stored in the memory 163. The memory 163 can store backlash amounts that correspond to a plurality of positions of the lens 164 along the optical axis direction of the optical system 169. The backlash amount can be an actuation amount for actuating the actuation mechanism 161. The backlash amount can be represented by the number of pulses that correspond to an actuation amount. The first control unit 142 can acquire the backlash information via the second control unit 162.

The first control unit 142 can control the position of the lens 164 by using the backlash information acquired from the second control unit 162.

An operation of controlling the lens 164 using the backlash information will be described with reference to FIG. 3. The first control unit 142 can set position 5 between position 3 and position 4. The first control unit 142 can set position 6 between position 2 and position 3. The first control unit 142, when moving the lens 164 from the position of position 4 to position 5, can refer to the backlash information and can determine a backlash amount corresponding to position 4. The first control unit 142 can use the determined backlash information and can correct the actuation amount of the actuation mechanism 161 for causing the lens 164 to move to position 5. For example, the first control unit 142 can determine, as the actuation amount of the actuation mechanism 161, a value in which the backlash amount corresponding to the position of position 4 is added to an actuation amount corresponding to $\Delta z/2$, with $\Delta z$ being a distance of position 4-position 5. As a result, the first control unit 142 can cause the lens 164 to correctly move to position 5.

The first control unit 142, when moving the lens 164 in the second direction, can use the backlash amount and can control such that position 5 and position 6 differ from all of position 1, position 2, position 3, and position 4. As a result, in all cases in which the lens 164 is moved in the first direction and all cases in which the lens 164 is moved in the second direction, it is possible to ensure that the positions of the lens 164 when capturing images for calculating the evaluation values do not overlap. Thus, in cases in which the lens 164 is caused to move in the second direction, the determining unit 149 does not need to capture images when the lens 164 is located near position 1, position 2, position 3, or position 4. Thus, it is possible to more quickly determine the focus position.

Figure 5:
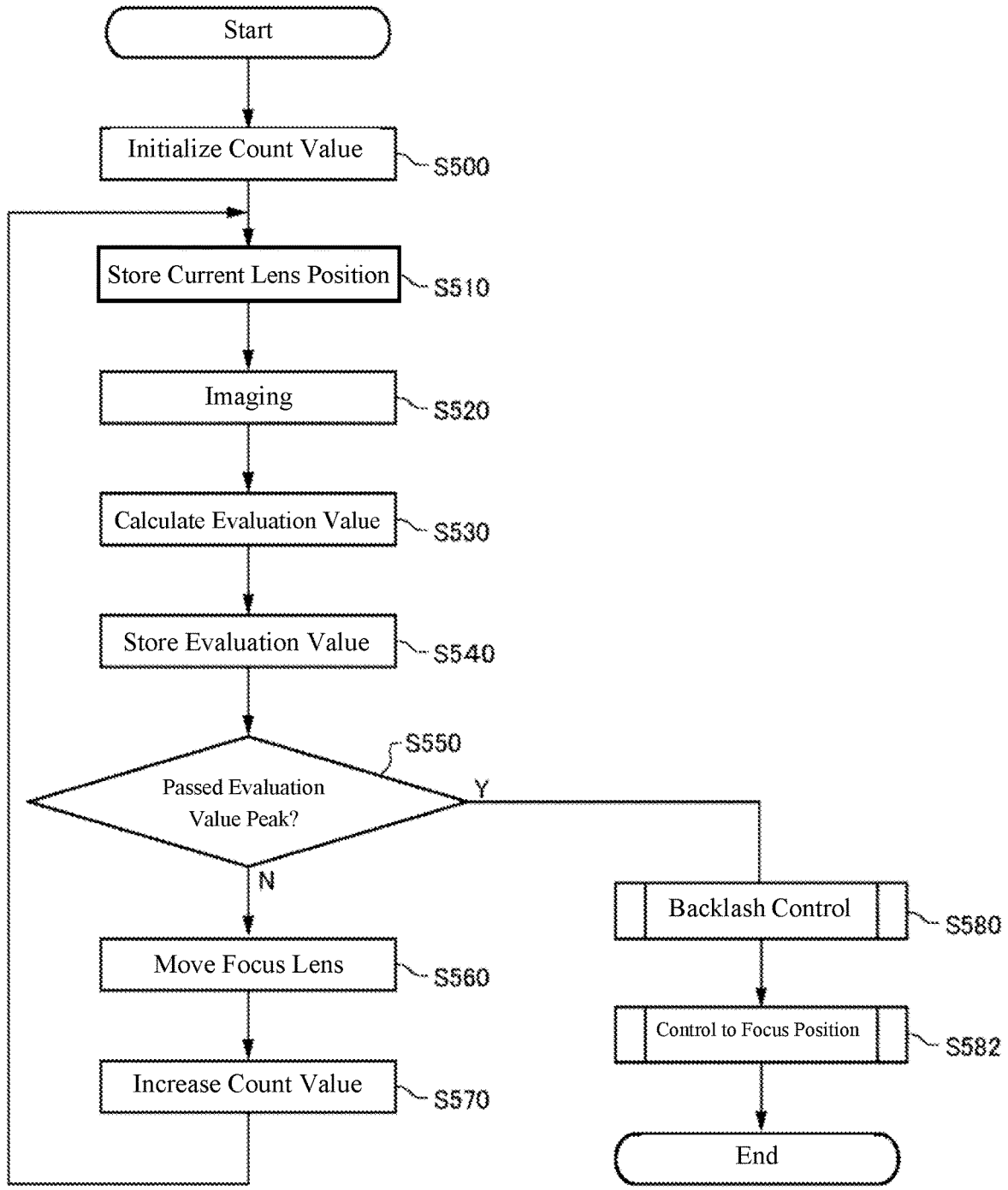
FIG. 5 is a flow chart that illustrates one example of a procedure for focus control of an imaging device 190.

FIG. 5 is a flow chart that illustrates one example of a procedure for focus control of the imaging device 190. The first control unit 142 can initialize a count value (S500). By initializing the count value, the control unit 142 can set to "position 1" the position of the lens 164 when capturing the first image from which evaluation values will be calculated. The count value increases each time the lens 164 moves. As a result, the position of the lens 164 can be sequentially set to "position 2," "position 3," and the like. The count value can be used as information for identifying the position of the lens 164 during one round of focus control. When storing an evaluation value and a position of the lens 164 in an array for storing an evaluation value and a position, the first control unit 142 can store the evaluation value and the position in a location within the array identified by the count value. An array is one example of a data structure that stores evaluation values and position data for the lens 164. A storage region for storing the data structure can be allocated from the storage region of the memory 146, for example.

The first control unit 142 can store the current position of the lens 164 in the array (S510). The first control unit 142 can cause the imaging element 144 to capture a first image for calculating an evaluation value (S520). The first control unit 142 can cause the calculation unit 148 to calculate a first evaluation value from the first image captured during S520 (S530). The first control unit 142 can store the first evaluation value obtained during S530 in the array (S540).

The first control unit 142 can determine whether an evaluation value peak has been passed. For example, the first control unit 142 can determine a maximum value from among the evaluation values already stored inside the array. The first control unit 142 can determine the position of the lens 164 at which the maximum value from among the evaluation values was obtained. When the first evaluation value calculated during S530 is lower than the maximum value and the difference between the first evaluation value calculated during S530 and the maximum value is larger than a pre-determined threshold, it can be determined that the evaluation value is past the peak. If it is determined that the evaluation value is not past the evaluation value peak, the first control unit 142 can proceed to S560.

During S560, the first control unit 142 can cause the lens 164 to move in the first direction. The position to which the lens 164 will move can be a position that is a pre-determined distance from the current position of the lens 164 in the first direction. The pre-determined distance can be the $\Delta z$ illustrated in FIG. 3. The first control unit 142 can increase the count value (S570). After S570, the first control unit 142 can proceed to S510.

If it is specified during S550 that the evaluation value peak has been passed, the first control unit 142 can proceed to S580. During S580, the first control unit 142 can perform movement of the lens 164 that is based on the backlash information. Next, the first control unit 142 can perform control for moving the lens 164 to the focus position (S582). S580 and S582 will be described in detail later.

Figure 6:
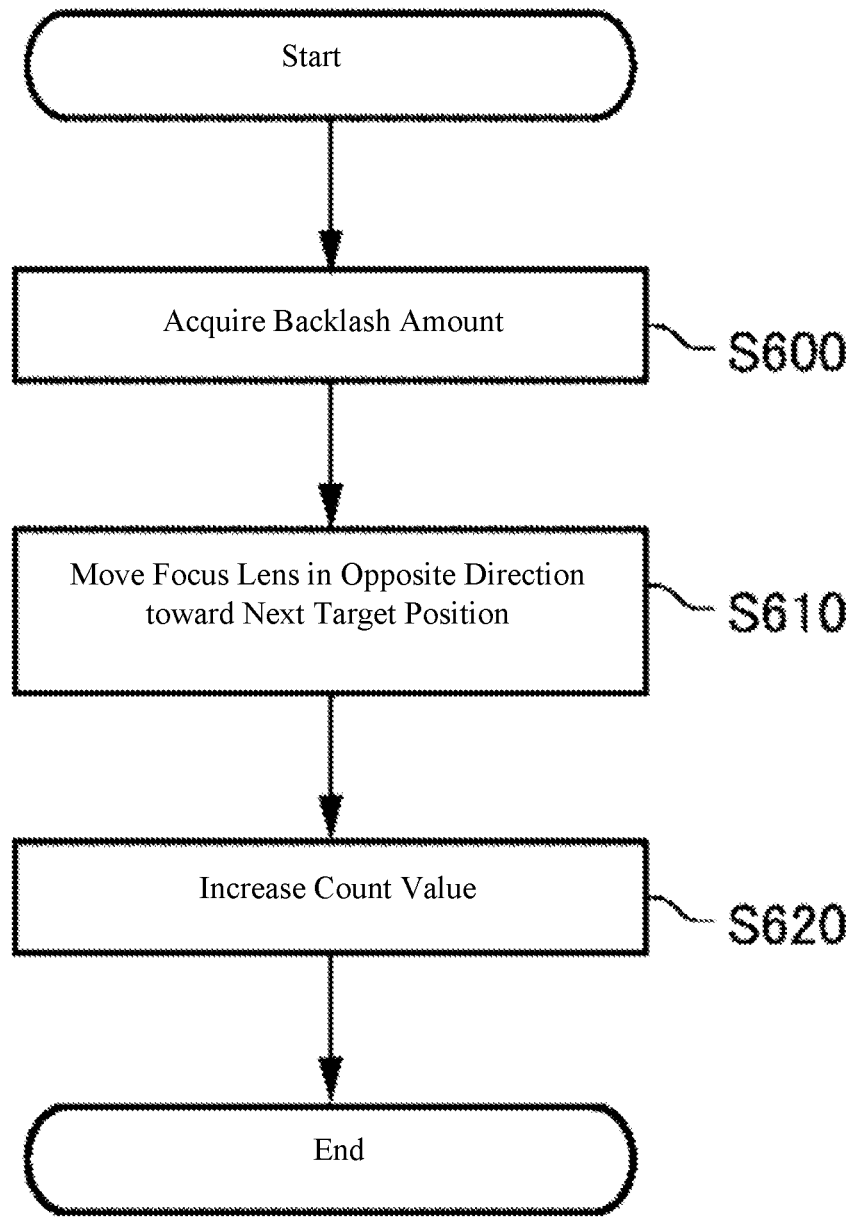
FIG. 6 is a flow chart that illustrates one example of a procedure for movement control of the lens 164 based on the backlash information.

FIG. 6 is a flow chart that illustrates one example of a procedure for movement control of the lens 164 that is based on the backlash information. The flow chart in FIG. 6 can be applied to the procedure in S580 in the flow chart in FIG. 5.

The first control unit 142 can acquire a backlash amount (S600). For example, the first control unit 142 can determine a backlash amount corresponding to the current position of the lens 164 by referring to the backlash information acquired from the lens device 160.

The first control unit 142 can cause the lens 164 to move in the second direction and can position the lens 164 in the first position 5 from among the second positions (S610). At such time, the first control unit 142 can add the backlash amount to an actuation amount of the actuation mechanism 161 for causing the lens 164 to move. For example, the first control unit 142 can add the backlash amount to an actuation amount causing the lens 164 to move by a pre-determined distance. The pre-determined distance can be the $\Delta z/2$ illustrated in FIG. 3. In such a case, the first control unit 142 is able to position the lens 164 at the midpoint between position 3 and position 4. As a result, the first control unit 142 is able to correctly position the lens 164 at position 5, from among the second positions, by referring to the backlash amount.

Next, the first control unit 142 can increase the count value (S620). As a result, movement control of the lens 164 based on the backlash information can end.

Figure 7:
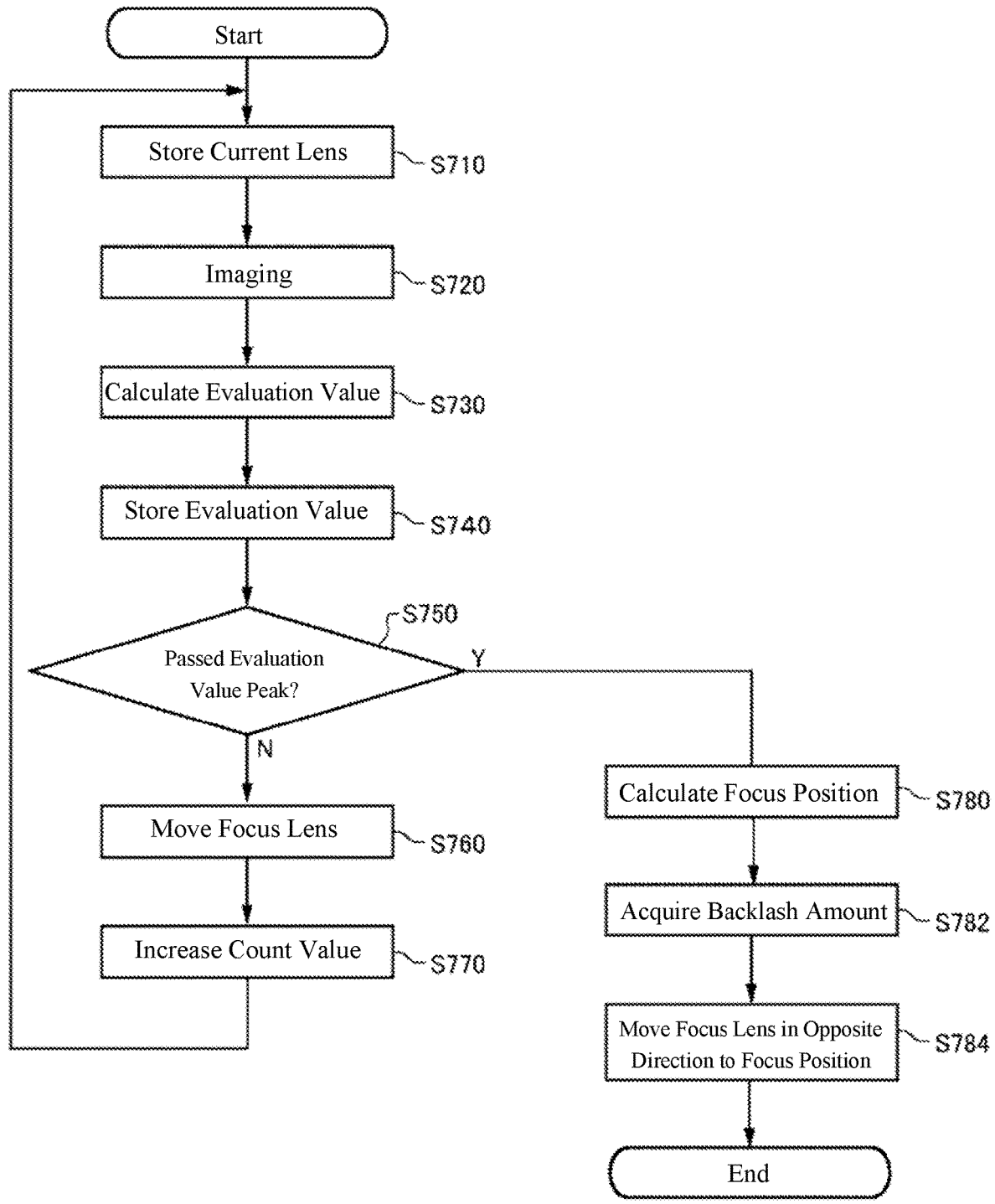
FIG. 7 is a flow chart that illustrates one example of a control procedure for moving a focus position.

FIG. 7 is a flow chart that illustrates one example of a control procedure for moving to the focus position. The flow chart in FIG. 7 can be applied to the procedure in S582 in the flow chart in FIG. 5.

The first control unit 142 can store the current position of the lens 164 in the array (S710). The first control unit 142 can cause the imaging element 144 to capture a second image for calculating an evaluation value (S720). The first control unit 142 can cause the calculation unit 148 to calculate a second evaluation value from the second image captured during S720 (S730). The first control unit 142 can store the second evaluation value obtained during S730 in the array (S740).

The first control unit 142 can determine whether the second evaluation value is past the evaluation value peak. For example, the first control unit 142 can determine a maximum value from among the evaluation values already stored inside the array. Here, the evaluation values stored inside the array can include the first evaluation value stored during S540 in FIG. 5. In other words, the first control unit 142 can determine a maximum value from among the already acquired first evaluation value and second evaluation value. When the second evaluation value calculated during S730 is lower than the maximum value and the difference between the second evaluation value calculated during S730 and the maximum value is larger than a pre-determined threshold, the first control unit 142 can determine that the second evaluation value is past the evaluation value peak. It is determined that the evaluation value peak has been passed when the current lens 164 is in a position further along in the second direction than the position of the lens 164 when the image in which the maximum value of the evaluation values was obtained was captured. For example, the first control unit 142 can determine that the evaluation value peak has been passed when the current position of the lens 164 is a position further along in the second direction than position 3, which corresponds to the maximum value E3 of the evaluation values in FIG. 3. In other words, the first control unit 142 can determine that the evaluation value peak has not been passed when the lens 164 is in a location that is further along in the first direction than position 3. If it is determined that the evaluation value peak has not been passed, the first control unit 142 can proceed to S760.

During S760, the first control unit 142 can cause the lens 164 to move in the second direction. The position to which the lens 164 will move can be a position that is a pre-determined distance from the current position of the lens 164 in the second direction. The pre-determined distance can be the Δz illustrated in FIG. 3. The first control unit 142 can increase the count value (S770). After S770, the first control unit 142 can proceed to S710.

If the first control unit 142 has determined during S750 that the evaluation value peak has been passed, the first control unit 142 proceeds to S780. During S780, the first control unit 142 can cause the determining unit 149 to determine the focus position. The determining unit 149 can calculate the position of the lens 164 at which the evaluation value reaches a maximum by using both the first evaluation value and the second evaluation value.

The first control unit 142 can acquire a backlash amount (S782). For example, the first control unit 142 can determine a backlash amount corresponding to the current position of the lens 164 by referring to the backlash information acquired from the lens device 160.

The first control unit 142 can cause the lens 164 to move to the focus position by causing the lens 164 to move in the first direction (S784). At such time, the first control unit 142 can add the backlash amount to an actuation amount of the actuation mechanism 161 for causing the lens 164 to move. For example, the first control unit 142 can add the backlash amount to an actuation amount corresponding to the difference between the focus position and the current position. As a result, the first control unit 142 is able to correctly position the lens 164 at the focus position.

The detection of passing the evaluation value peak can be applied to a method of detecting that the evaluation value has decreased by at least a threshold Δ from the maximum evaluation value of the evaluation values. Alternatively, the detection can be applied to a method of detecting that an evaluation value continuously obtained when moving the lens 164 in a specific direction has continuously decreased by at least a fixed number.

FIG. 8 illustrates in tabular form one example of the details of operations executed during focus control by the first control unit 142. The table in FIG. 8 illustrates chronologically-executed steps and the details of the operations carried out during each step. FIG. 8 illustrates the details of operations for the example in FIG. 3.

During Step 1, the lens 164 can be moved in the first direction after imaging and the calculation of the evaluation values. Next, the following can be carried out during Step 2: imaging, calculation of the evaluation values, and detection of passing the evaluation value peak. If peak passage is not detected, the lens 164 can be moved in the first direction. The following can be carried out during Step 3: imaging, calculation of the evaluation values, and detection of passing the evaluation value peak. If peak passage is not detected, the lens 164 can be moved in the first direction.

The following can be carried out during Step 4: imaging, calculation of the evaluation values, and detection of passing the evaluation value peak. If peak passage is detected, movement control of the lens 164 based on the backlash information can be carried out. The following can be carried out during Step 5: imaging, calculation of the evaluation values, and detection of passing the evaluation value peak. If peak passage is not detected, the lens 164 can be moved in the second direction. The following can be carried out during Step 6: imaging, calculation of the evaluation values, and detection of passing the evaluation value peak. If peak passage is detected, the lens 164 can be moved to the focus position determined by the determining unit 149.

Figure 9:
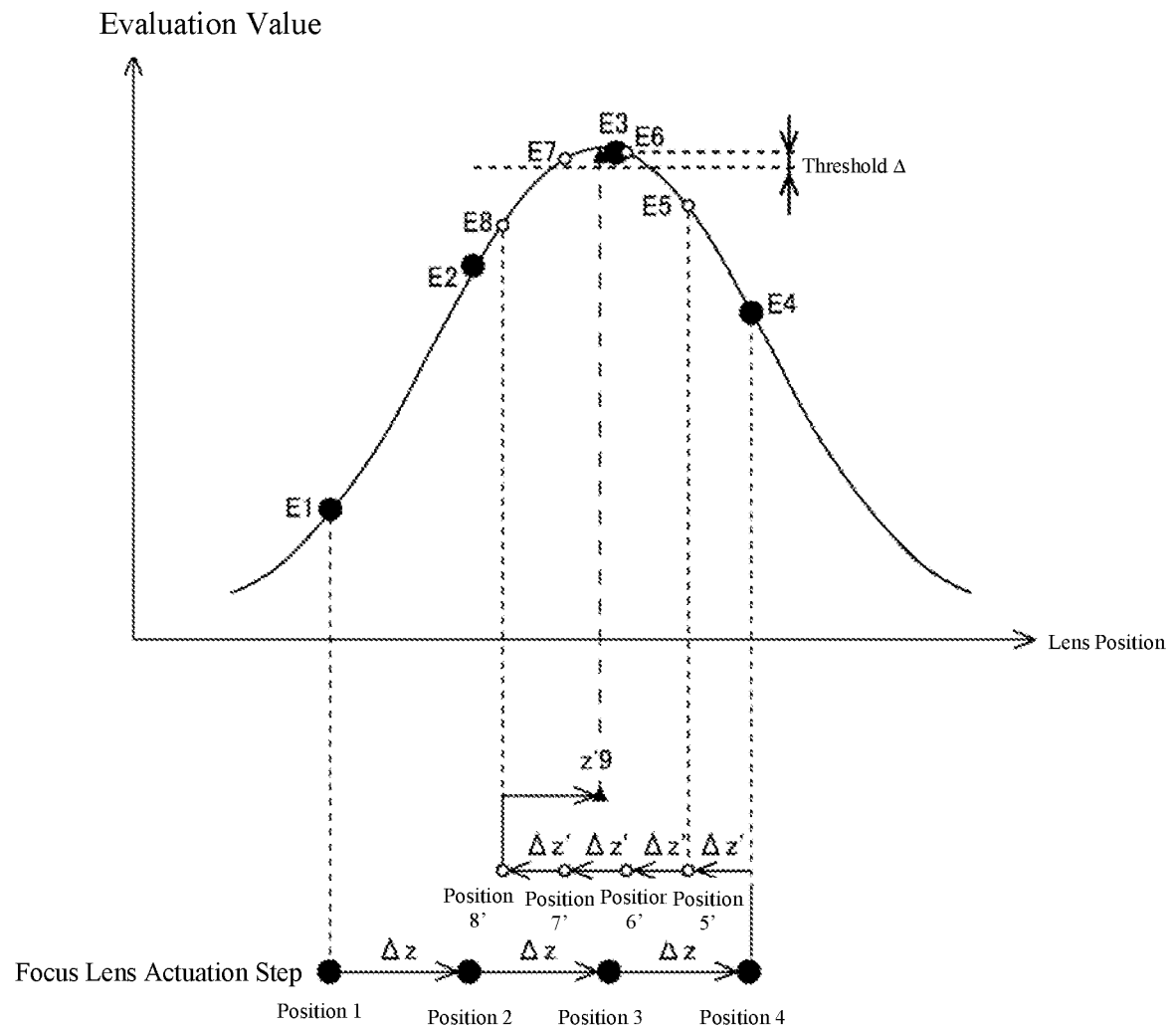
FIG. 9 illustrates a relationship between an evaluation value and a position of a focus lens resulting from focus control in a comparison example.

FIG. 9 illustrates a relationship between an evaluation value and a position of a focus lens resulting from focus control in a comparison example. For the operations from position 1 to position 4, identical operations to the operations illustrated in FIG. 3 can be carried out. During the focus control in this comparison example, the focus position can be determined by using only the evaluations values obtained by moving the focus lens in the second direction after peak passage has been detected at position 4. The operations from position 1 to position 4 can correspond to rough actuating that roughly searches for the evaluation value peak.

In order to increase the determination precision of the focus position, fine actuation can be performed in the second direction. Specifically, the movement distance $\Delta z'$ per movement in the second direction can be made shorter than $\Delta z$. The focus lens can be moved in the second direction, and evaluation values can be calculated from the images when the focus lens is in position 5', position 6', position 7', and position 8'. The evaluation values corresponding to position 5', position 6', position 7', and position 8' are E5', E6', E7', and E8'. In the example in FIG. 9, E6'>E5', E7'<E6', E8'<E7', and E7'>E6'-Δ. Thus, during the step where the evaluation value E7' can be obtained, it is not possible to determine whether the evaluation value peak has been passed. It is first possible to determine that the evaluation value peak has been passed during the step where the evaluation value E8' can be obtained. Then, focus position 7' can be calculated using E5', E6', and E7', for example.

According to the focus control of the comparison example, compared to the focus control in the imaging device 190, for example, it is necessary to capture substantially more images in order to detect passage of the evaluation value peak. The comparison example in FIG. 9 illustrates a case in which $\Delta z'<\Delta z/2$. In the comparison example in FIG. 9, even when $\Delta'z=\Delta z/2$, a peak passage cannot be detected if images when the focus lens is in at least three positions along the second direction are not captured. Even if it was possible to detect a peak passage using three points, only the evaluation values from three points can be used to determine the focus position. In addition, an evaluation value for a position that overlaps or is extremely close to the position of the focus lens when being moved in the first direction will be calculated. Thus, it is not possible to effectively use evaluation values from when the focus lens was moved in the first direction. In addition, when evaluation values for five points are required in order to determine the focus position, the evaluation values for the five points must be obtained by moving the focus lens in the second direction. Therefore, according to the focus control of the comparison example, it will take a substantially long time to determine the focus position.

FIG. 10 illustrates in tabular form one example of the details of operations executed during focus control in the comparison example. The table in FIG. 10 illustrates chronologically-executed steps and the details of operations carried out during each step. FIG. 10 illustrates the details of operations for the example in FIG. 9.

The details of the operations of Step 1 to Step 3 are identical to that of Step 1 to Step 3 in FIG. 8. The following can be carried out during Step 4: imaging, calculation of the evaluation values, and detection of passing the evaluation value peak. If peak passage is detected, movement control of the focus lens based on the backlash information can be carried out. In such a case, the movement distance of the focus lens can be Δz'. The following can be carried out during Step 5: imaging, calculation of the evaluation values, and detection of passing the evaluation value peak. If peak passage is not detected, the focus lens can be moved in the second direction. Similar to Step 5, the following can be carried out during Step 6 and Step 7, respectively: imaging, calculation of the evaluation values, and detection of passing the evaluation value peak. During Step 6 and Step 7, respectively, the focus lens can be moved in the second direction.

The following can be carried out during Step 8: imaging, calculation of the evaluation values, and detection of passing the evaluation value peak. When peak passage is detected, the focus position can be calculated using evaluation values calculated from the images when the focus lens is in position 5', position 6', and position 7', for example. The lens 164 can be then moved to the calculated focus position. In this manner, according to the focus control of the comparison example, Step 8 will be necessary to determine the focus position.

As described in relation to FIGS. 9 and 10, according to the focus control of the comparison example, a greater number of steps are required in order to detect passing the evaluation value peak. Thus, it will take a longer amount of time to complete focus control. As a countermeasure, according to the focus control of the imaging device 190, peak passage can be detected using fewer steps. Therefore, it is possible to shorten the amount of time required to complete focus control.

In the description above, an example was described in which a backlash amount corresponding to the position of the lens 164 was stored as backlash amount information for the lens 164. However, the backlash amount can be a constant value that does not depend on the position of the lens 164. The backlash amount of a constant value can be stored in the memory 163. The backlash amount stored in the lens 164 can be a measured value of a backlash amount for each lens 164. The backlash amounts stored in the lens 164 can be a designed value established by the design of the actuation mechanism 161.

The movement control of the lens 164 described above can be applied not only to intermittent actuation that calculates evaluation values by capturing images while the lens 164 is stopped after having been moved, but also continuous actuation in which evaluation values are calculated by capturing images while the lens 164 is moving without stopping the lens 164. In the case of intermittent actuation, a plurality of pulses corresponding to Δz should be provided to the actuation mechanism 161 every time the lens 164 moves in the manner described above, and the first locations when the lens 164 moves in the first direction should not overlap the second locations when the lens 164 moves in the second direction. Meanwhile, in the case of continuous actuation, the movement speed of the lens should be controlled such that the locations of the lens 164 when the images from which the evaluation values will be calculated are acquired do not overlap between cases in which the lens moves in the first direction and cases in which the lens moves in the second direction.

In the UAV 100, the imaging device 190 can be supported by the gimbal 110. However, the location at which the imaging device 190 is provided is not limited to the gimbal 110. The imaging device 190 can be a sensing imaging device that images the surroundings of the UAV 100. The sensing imaging device can be provided on the nose of the UAV 100. The sensing imaging device can be provided on the bottom surface of the UAV 100. The sensing imaging device can be provided on at least one of the nose and bottom surface of the UAV 100. Three-dimensional spatial data of the surroundings of the UAV 100 can be generated in accordance with the images captured by the sensing imaging device. At least one sensing imaging device can be provided on each of the following parts of the UAV 100: the nose, the tail, the side faces, the bottom surface, and the upper surface. The angle of view that can be set via the sensing imaging device can be wider than the angle of view that can be set via the imaging device 190. The sensing imaging device can have a prime lens or a fisheye lens.

Figure 11:
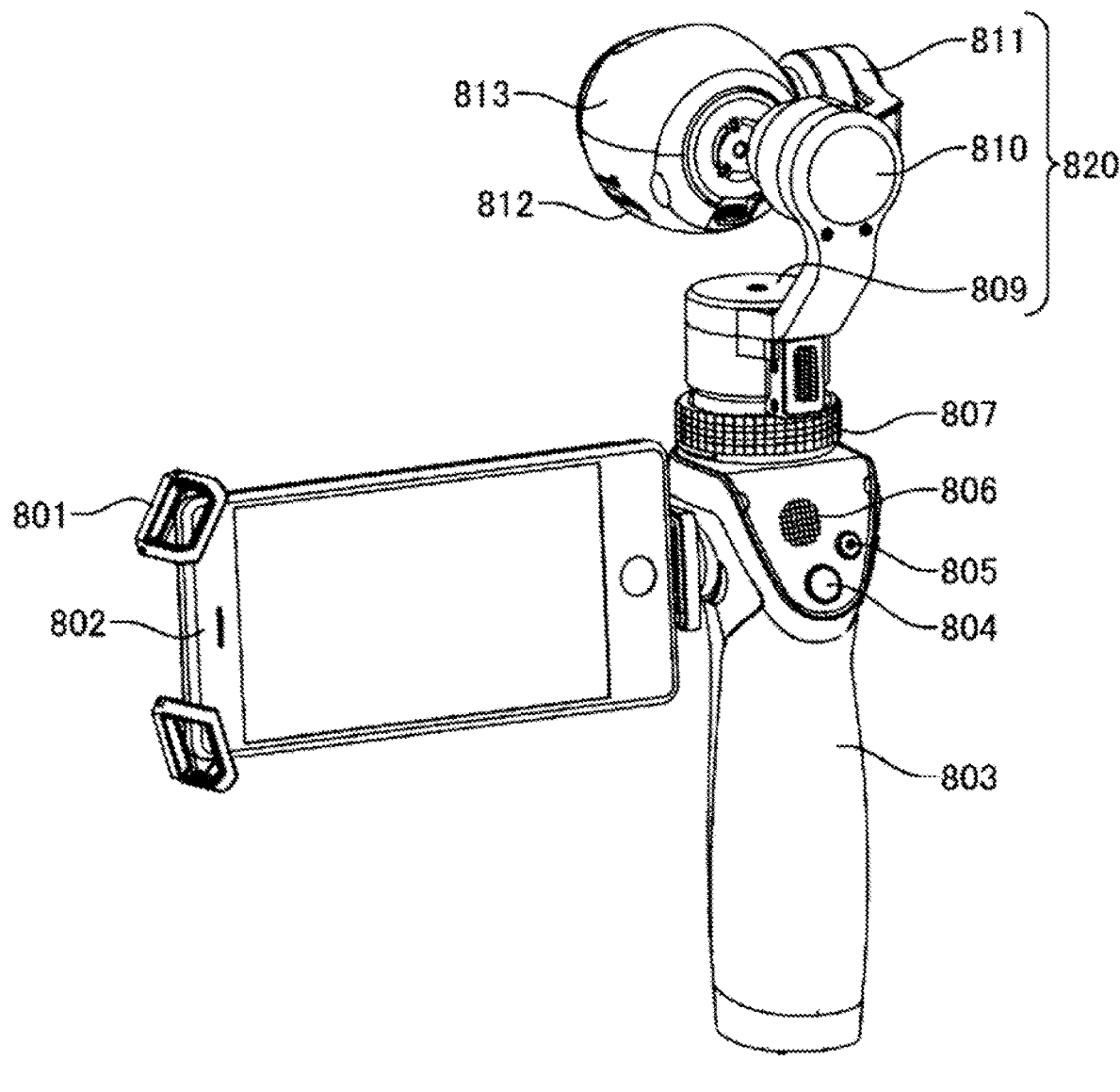
FIG. 11 is an external perspective view that illustrates one example of a stabilizer 800.

FIG. 11 is an external perspective view that illustrates one example of a stabilizer 800. The stabilizer 800 is one example of a moving object. The imaging device 190 can be mounted on a moving object other than the UAV 100. A camera unit 813 included in the stabilizer 800 can include the imaging device 190, for example.

The stabilizer 800 can include: the camera unit 813; a gimbal 820; and a handle 803. The gimbal 820 rotatably can support the camera unit 813. The gimbal 820 can have a pan axis 809, a roll axis 810, and a tilt axis 811. The gimbal 820 can rotatably support the camera unit 813 about the pan axis 809, the roll axis 810, and the tilt axis 811. The gimbal 820 is an example of a carrier.

The camera unit 813 is one example of the imaging device. The camera unit 813 can have a slot 812 for inserting memory. The gimbal 820 is fixed to the handle 803 via a holder 807.

The handle 803 can have various types of buttons for operating the gimbal 820 and the camera unit 813. The handle 803 can include: a shutter button 804; a record button 805; and an operation button 806. By pressing the shutter button 804, it is possible to record still images via the camera unit 813. By pressing the record button 805, it is possible to record moving images via the camera unit 813.

A device holder 801 can be fixed to the handle 803. The device holder 801 can hold a mobile device 802 such as a smartphone. The mobile device 802 can be communicatively coupled to the stabilizer 800 via a wireless network such as Wi-Fi. As a result, it is possible to cause images captured via the camera unit 813 to be displayed on the screen of the mobile device 802.

According to the stabilizer 800, it is possible to shorten the amount of time required to complete focus control in the camera unit 813.

An embodiment was described in which the imaging device 190 was provided on a moving object. However, the imaging device 190 is not limited to an imaging device included in a moving object. The imaging device 190 can function as a single imaging device. The imaging device 190 can be a single-lens reflex camera. The imaging device 190 can be a non-interchangeable lens camera. The imaging device 190 can be a so-called "compact digital camera." The imaging device 190 can be a video camera.

Figure 12:
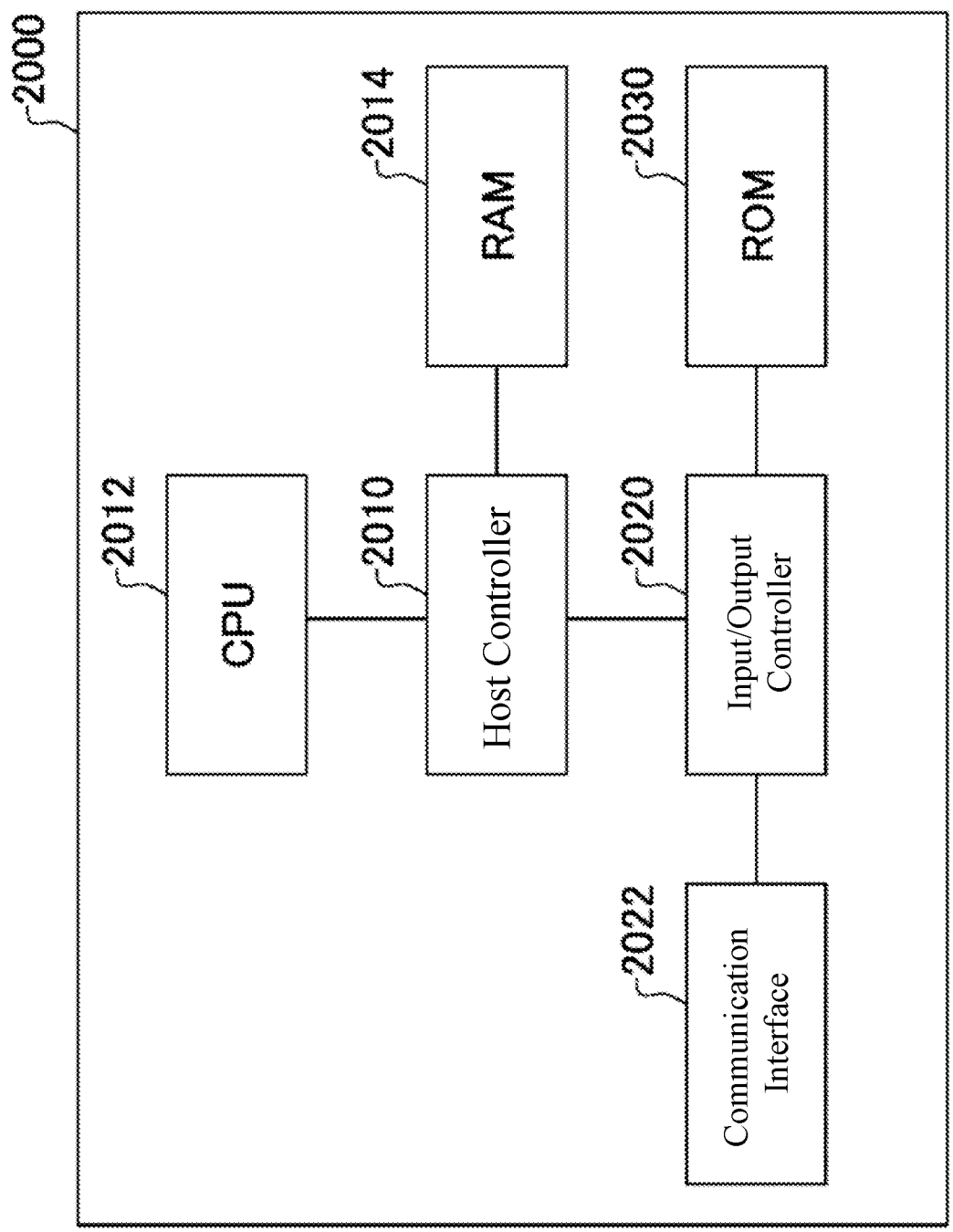
FIG. 12 illustrates one example of a computer 2000 according to a plurality of aspects.

FIG. 12 shows one example of a computer 2000 in which a plurality of aspects of the present disclosure can be completely or partially realized. Programs installed in the computer 2000 can cause the computer 2000 to function as operations associated with a device according to an embodiment of the present disclosure or as one or more of "units" in such a device. The programs can cause the computer 2000 to execute the operations or the one or more of "units." The programs can cause the computer 2000 to execute a process according to an embodiment of the present disclosure or the steps of such a process. Such programs can be executed via a CPU 2012 in order to cause the computer 2000 to execute specific operations associated with some or all of the blocks in the block diagrams and the flow charts described in the present specification.

The computer 2000 according to the present embodiment can include the CPU 2012 and RAM 2014. These elements can be coupled to each other via a host controller 2010. The computer 2000 further can include a communication interface 2022 and an input/output unit. These elements can be coupled to the host controller 2010 via an input/output controller 2020. The computer 2000 includes ROM 2030. The CPU 2012 can operate in accordance with programs stored within the ROM 2030 and RAM 2014, and thereby can control the various units.

The communication interface 2022 can communicate with other electronic devices via a network. The ROM 2030 can store therein boot programs and the like executed by the computer 2000 during activation and/or programs that are dependent on the hardware of the computer 2000. The programs can be provided via a network or a computer readable recording medium such as CD-ROM, DVD-ROM, USB memory, or an IC card. The RAM 2014 and the ROM 2030 can be examples of a computer readable recording medium. The programs can be installed in the ROM 2030 or the RAM 2014, and are executed by the CPU 2012. The information processing described within these programs is read by the computer 2000, and links the programs with the various types of hardware resources mentioned above. A device or method can be configured by realizing the operation or processing of information in accordance with the usage of the computer 2000.

For example, when communication is carried out between the computer 2000 and an external device, the CPU 2012 can execute communication programs that have been loaded onto the RAM 2014 and can then instruct the communication interface 2022 to perform communication processing in accordance with the processing specified in the communication programs. The communication interface 2022, under the control of the CPU 2012, can read transmission data stored in a transmit buffer processing region provided within a recording medium such as the RAM 2014 or USB memory. The communication interface 2022 can send the read transmission data to a network. The communication interface 2022 can write transmission data received from the network in a receive buffer processing region or the like provided in the recording medium.

In addition, the CPU 2012 can be configured such that an entire database, necessary portions of the database, or files stored in an external recording medium such as USB memory or the like, are read by the RAM 2014. The CPU 2012 can then execute various types of processing on the data in the RAM 2014. Next, the CPU 2012 can write back the processed data onto the external recording medium.

Various types of information such as various types of programs, data, tables, and databases can be stored on the recording medium and can receive various types of information processing. The CPU 2012 can perform various types of processing and various types of operations, which are described throughout the present specification and are specified by the instruction sequences of the programs, on the data read from the RAM 2014. These types of processing can include: information processing, conditional judgement, conditional branching, unconditional branching, information retrieval/substitution, and the like. The CPU 2012 then can write back the results onto the RAM 2014. In addition, the CPU 2012 can retrieve information from files, a database, or the like within the recording medium. For example, when a plurality of entries each having a characteristic value of a first characteristic associated with a characteristic value of a second characteristic are stored within the recording medium, the CPU 2012 can do the following: retrieve from among the plurality of entries an entry that matches conditions specified by the characteristic value of the first characteristic; read the characteristic value of the second characteristic stored within the entry; and thereby obtain the characteristic value of the second characteristic that is associated with the first characteristic that satisfies the predetermined conditions.

The above-described programs or a software module can be stored in the computer 2000 or on a computer readable medium near the computer 2000. In addition, a recording medium such as a hard disk or RAM provided within a server system coupled to the internet or a dedicated communication network, can be used as the computer readable medium. The programs stored in the computer readable medium can be provided to the computer 2000 via a network.

The present disclosure was described using embodiments, but the technical scope of the disclosure is not limited to the scope in the above embodiments. It should be clear to a person skilled in the art that the above embodiments are susceptible to various modifications or improvements. It should also be clear from the scope of the claims that forms having such modifications or improvements can be included in the technical scope of the present disclosure.

The order of each process in the operations, procedures, steps, stages, and the like of the devices, systems, programs, and methods in the scope of the claims, specification, and drawings is not specifically disclosed using "beforehand", "in advance", and the like, and any order is possible as long as a postprocess does not use the output of a preprocess. Even if "first," "next", and the like are used for convenience in describing the flow of operations in the scope of the claims, specification and drawings, it is not meant that it must be executed in this order.

DESCRIPTION OF REFERENCE NUMERALS

100 UAV
101 UAV body
102 Interface
104 Third control unit
106 Memory
107 Drive unit
108 Rotary wing
110 Gimbal
140 Imaging unit
142 First control unit
144 Imaging element
146 Memory
148 Calculation unit
149 Determining unit
160 Lens device
161 Actuation mechanism
162 Second control unit
163 Memory
164, 166, 168 lens
169 Optical system
190 Imaging device
800 Stabilizer
801 Device holder
802 Mobile device
803 Handle
804 Shutter button
805 Record button
806 Operation button
807 Holder
809 Pan axis
810 Roll axis
811 Tilt axis
812 Slot
813 Camera unit
820 Gimbal
2000 Computer
2010 Host Controller
2012 CPU
2014 RAM
2020 Input/Output controller
2022 Communication interface
2030 ROM

What is claimed is:

1. An imaging device, comprising:
a lens;
a memory storing a plurality of lens backlash amounts each corresponding to one of a plurality of lens positions; and
a circuit configured to:
obtain, from the memory, the plurality of lens backlash amounts;
control, in a first direction along an optical axis of the lens:
the lens to move in the first direction; and
capture of a plurality of first images via the lens when the lens is positioned at a plurality of first positions, respectively;
determine, based on the plurality of first positions and the plurality of lens backlash amounts, one or more second positions, the one or more second positions each being different from all of the plurality of first positions;
control, in a second direction along the optical axis that is opposite to the first direction:
the lens to move in the second direction;
capture of one or more second images via the lens when the lens is positioned at the one or more second positions, respectively; and
control not to capture images at the plurality of first positions; and
determine a focus position based on:
one or more of a plurality of first evaluation values calculated from the plurality of first images, each of the plurality of first evaluation values indicating a corresponding focus state,
one or more second evaluation values calculated from the one or more second images, each of the one or more second evaluation values indicating a corresponding focus state, and
one or more lens backlash amounts corresponding to the one or more second positions.

2. The imaging device of claim 1, wherein:
the one or more second positions include a plurality of second positions each being different from all of the plurality of first positions;
the one or more second images include a plurality of second images captured at the plurality of second positions, respectively; and
the one or more second evaluation values include a plurality of second evaluation values calculated from the plurality of second images, each of the plurality of second evaluation values indicating a corresponding focus state.

3. The imaging device of claim 2, wherein the circuit is further configured to, when controlling the lens to move in the second direction after controlling the lens to move in the first direction, control the lens to move to one of the second positions that is different from all of the plurality of first positions.

4. The imaging device of claim 3, wherein:
the circuit is further configured to, when controlling the lens to move in the second direction after controlling the lens to move in the first direction, control the lens to move to the one of the second positions that is different from all of the plurality of first positions according to a lens backlash amount corresponding to a current position of the lens.

5. The imaging device of claim 2, wherein the circuit is further configured to determine the focus position based on:
the one or more of the plurality of first evaluation values, one or more of the plurality of first positions, the one or more of the plurality of first evaluation values being calculated from one or more of the plurality of first images that are respectively captured at the one or more of the plurality of first positions,
the plurality of second evaluation values, and
the plurality of second positions.

6. The imaging device of claim 1, wherein the circuit is further configured to determine the focus position based on:
the one or more of the plurality of first evaluation values, one or more of the plurality of first positions, the one or more of the plurality of first evaluation values being calculated from one or more of the plurality of first images that are respectively captured at the one or more of the plurality of first positions,
the one or more second evaluation values, and
the one or more second positions.

7. A moving object comprising the imaging device of claim 1.

8. A moving object comprising the imaging device of claim 2.

9. A moving object comprising the imaging device of claim 3.

10. An imaging system, comprising:
    the imaging device of claim 1;
    a carrier that supports the imaging device; and
    a handle attached to the carrier.

11. An imaging system, comprising:
    the imaging device of claim 2;
    a carrier that supports the imaging device; and
    a handle attached to the carrier.

12. An imaging system, comprising:
    the imaging device of claim 3;
    a carrier that supports the imaging device; and
    a handle attached to the carrier.

13. The imaging device of claim 1, wherein the one or more second positions includes two second positions, each of the two second positions is at a midpoint between two adjacent positions of the plurality of first positions.

14. The imaging device of claim 13, wherein:
    the plurality of first positions include three adjacent positions including a first point, a second point, and a third point, wherein the second point is between the first point and the third point;
    the two second positions include a fourth point and a fifth point, the fourth point being at the midpoint between the third point and the second point, and the fifth point being at the midpoint between the second point and the first point; and
    the focal position is determined based on the evaluation values corresponding to the fourth point, the second point, and the fifth point on an evaluation value versus lens position curve.

15. The image device according to claim 1, wherein the circuit is further configured to determine the focus position by performing an interpolation using both of:
    one or more of the plurality of first evaluation values corresponding to one or more lens positions when the lens move in the first direction along the optical axis of the lens; and
    one or more of the plurality of second evaluation values corresponding to one or more lens positions when the lens move in the second direction along the optical axis of the lens.

* * * * *